United States Patent [19]

Andrews et al.

[11] Patent Number: 4,826,921

[45] Date of Patent: May 2, 1989

[54] COATING COMPOSITION

[75] Inventors: Adrian F. Andrews, County Durham; Nicholas S. Hugh, Crewe; Michael J. Nunn, Hexham, all of United Kingdom

[73] Assignee: International Paint public limited company, United Kingdom

[21] Appl. No.: 92,175

[22] Filed: Sep. 2, 1987

[30] Foreign Application Priority Data

Sep. 5, 1986 [GB] United Kingdom ................ 8621472

[51] Int. Cl.$^4$ .................. C08L 9/00; C08L 33/08; C08L 67/02; C08L 71/02
[52] U.S. Cl. ..................................... 525/102; 525/109; 525/131; 525/167; 525/174; 525/187; 525/204; 525/207; 525/406; 525/442; 525/454; 525/476
[58] Field of Search ............... 525/167, 174, 442, 187, 525/406, 109, 204, 207, 131, 454, 102, 476

[56] References Cited

U.S. PATENT DOCUMENTS

| | | | |
|---|---|---|---|
| 3,245,933 | 4/1966 | Muskat | 524/388 |
| 4,176,142 | 11/1979 | Lewis et al. | 525/336 |
| 4,452,948 | 6/1984 | Marrion et al. | 525/207 |

FOREIGN PATENT DOCUMENTS

| | | |
|---|---|---|
| 0049098 | 4/1982 | European Pat. Off. |
| 134691 | 3/1985 | European Pat. Off. |
| 1583316 | 1/1981 | United Kingdom |

*Primary Examiner*—Patricia Short
*Attorney, Agent, or Firm*—Steele, Gould & Fried

[57] ABSTRACT

A coating composition comprising an anhydride polymer (A) containing at least two cyclic carboxylic acid anhydride functional groups and a polymer (B) containing at least two functional groups reactive with anhydride groups and selected from hydroxyalkylamino, hydroxyalkoxyalkylamino, hydroxysubstituted acyloxyalkylamino, hydroxysubstituted polyacyloxyalkylamino, mercaptoalkylamino and oxazolidino groups. One of the polymers (A) and (B) comprises at least one flexible polymer chain selected from polyether, polyester, silicone, diene polymer, hydrogenated diene polymer, polyurethane, polyisobutylene and polyacrylate chains. The functional groups characteristic of that polymer are each present as a terminal group at the end of a flexible polymer chain.

13 Claims, No Drawings

COATING COMPOSITION

FIELD OF THE INVENTION

This invention relates to a coating composition capable of curing at ambient or low temperature and to its production.

BACKGROUND OF THE INVENTION

U.S. Pat. No. 4,452948, describes a two-pack coating composition comprising a hydroxy component and an anhydride component, in which the hydroxy component is a polymer having at least two free hydroxyl groups per molecule and also has in its molecule amine groups for accelerating the curing reaction between the hydroxyl groups and the anhydride groups and the anhydride component is a polymer having at least two cyclic carboxylic acid anhydride groups per molecule. The coatings of U.S. Pat. No. 4,452,948 have the advantage that they are ambient-temperature-curing without the use of toxic isocyanates and have been used successfully for repainting cars and as paints for yachts.

European Patent Application 49098 describes a three-component coating composition comprising a first polymer containing carboxylic acid anhydride or acid chloride groups, an amine or alcohol or a derivative thereof which is a tertiary amine, a ketimine, an acetal or an oxazolidine, and a second polymer capable of cross-linking with the first polymer in the presence of the amine or alcohol.

European Patent Application 134691 describes a three-component coating composition comprising a compound having at least two hydroxyl groups, a compound having at least two anhydride groups and a compound having at least two epoxide groups.

SUMMARY OF THE INVENTION

An object of the present invention is to provide an ambient- or low-temperature curing coating having increased resistance to impact and abrasion, for use for example in ship's holds, anchor pockets and decks, on mining equipment, tracks, sides of conveyors, edges of buildings, filing cabinets and computer terminals.

A coating composition according to the present invention comprises an anhydride polymer (A) containing at least two cyclic carboxylic acid anhydride functional groups and a polymer (B) containing at least two functional groups reactive with anhydride groups and selected from hydroxyalkylamino, hydroxyalkoxyalkylamino, hydroxy-substituted acyloxyalkylamino, hydroxy-substituted polyacyloxyalkylamino, mercaptoalkylamino and oxazolidino groups, in which composition either the polymer (A) or the polymer (B) comprises a flexible polymer chain selected from polyether, polyester, silicone, diene polymer, hydrogenated diene polymer, polyurethane, polyisobutylene and polyacrylate chains and the functional groups for that polymer, namely either the anhydride groups (where polymer (A) comprises a flexible polymer chain) or the groups reactive with anhydride groups (where polymer (B) comprises a flexible polymer chain), are each present as a terminal group at the end of a flexible polymer chain.

The invention also provides a process for the preparation of a coating composition comprising reacting a polymer which comprises at least one flexible polymer chain selected from polyether, polyester, silicone, diene polymer, hydrogenated diene polymer, polyurethane polyisobutylene and polyacrylate chains with a reactant either to introduce at least two cyclic carboxylic acid anhydride functional groups, thus forming a polymer (A), or to introduce at least two functional groups reactive with anhydride groups and selected from hydroxyalkylamino, hydroxyalkoxyalkylamino, hydroxy-substituted acyloxyalkylamino, hydroxy-substituted polyacyloxyalkylamino, mercaptoalkylamino and oxazolidino groups, thus forming a polymer (B), which polymer (A) or (B) contains each of its functional groups as a terminal group at the end of a flexible polymer chain, and forming a coating composition from said polymer (A) and a polymer (B') containing at least two functional groups reactive with anhydride groups and selected from hydroxyalkylamino, hydroxyalkoxyalkylamino, hydroxy-substituted acyloxyalkylamino, hydroxy-substituted polyacyloxyalkylamino, mercaptoalkylamino and oxazolidino groups, or from said polymer (B) and a polymer (A') containing at lest two cyclic carboxylic acid anhydride functional groups.

DETAILED DESCRIPTION

Coatings in which the polymer (B) comprises a flexible polymer chain are preferred. Examples of flexible polyether chains are aliphatic polyether chains such as polyethylene oxide, polypropylene oxide and poly(tetramethylene oxide). The polyether chain preferably has a molecular weight of at least 200. Polyether chains of molecular weight 200 to 3500 are preferred. Examples of flexible polyester chains are aliphatic polyesters formed from ethylene glycol, propylene glycol, 1,3-propanediol, 1,6-hexanediol and/or 1,4-butanediol with adipic, azelaic or sebacic acid and polycaprolactones. The aliphatic polyester chain preferably has a molecular weight of 500-4000. Examples of flexible diene polymer chains are polybutadiene, polyisoprene and butadiene copolymers with acrylonitrile and/or styrene. Fully or partly hydrogenated products of these diene polymers are also suitable. The diene polymer chain preferably has a molecular weight of 500-7000. Examples of preferred flexible silicone resin chains are polydimethylsiloxanes. Examples of flexible polyurethane chains are those derived from polyester diols and polyisocyanates, particularly aliphatic polyisocyanates. Examples of flexible polyacrylate chains are linear polymers of alkyl acrylates having at least 2C atoms in the alkyl group, for example polybutyl acrylate.

The polymer which comprises a flexible polymer chain is usually a linear flexible polymer having end groups which are anhydride groups or groups reactive with anhydride groups and selected from those specified above. It can alternatively be a branched polymer, for example a star polymer having three or more limbs. At least one of the limbs of such a polymer, and preferably all of them, comprises a flexible polymer chain. At least two of the limbs, and preferably all of them, are tipped with anhydride groups or groups reactive with anhydride groups and selected from those specified above.

The preferred reactive groups in polymer (B) are beta-hydroxyamino groups, either alone or in conjunction with one or more groups having hydroxy substituents which are more remote from the amino nitrogen atom. The polymer (B) preferably contains at least two beta-hydroxyamino groups per molecule. The alkyl, alkoxy and acyloxy moieties in the reactive groups suitably have not more than 6 carbon atoms and in the case of the alkyl and alkoxy moieties preferably have not more than 4 carbon atoms. Usually they have at least 2 carbon atoms.

The hydroxyalkylamino or mercaptoalkylamino, for example beta-hydroxyamino or beta-mercaptoamino, groups can be formed by appropriate reactions of an amine-tipped polymer. Amine-tipped polyethers are commercially available, for example poly(tetramethylene oxide) of various molecular weights from 750–2200 tipped with 3-aminopropyl groups, polypropylene oxide of molecular weights from 400 to 3000 tipped with aminoalkyl groups and low molecular weight polyether amines such as 4,7,10-trioxatridecane-1,13-diamine. Amino-alkyl tipped diorganosiloxanes are also commercially available. Primary or secondary amine groups can be reacted with an epoxide to form beta-hydroxy amino groups according to the reaction:

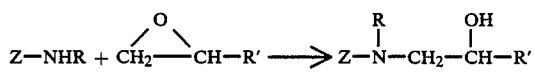

where Z is the polymer residue, R is hydrogen or an alkyl group and R' is hydrogen or an organic group which is attached to the oxirane ring through a carbon atom and which can be substituted by a group not reactive with amine groups. Primary amine groups where R is hydrogen will react with a further molecule of epoxide to form bis(beta-hydroxy) amine groups according to the reaction:

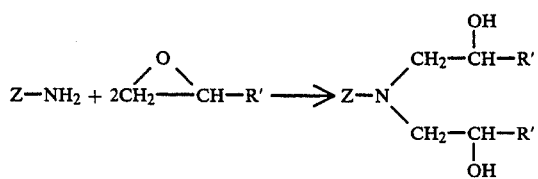

Polymers containing two such bis(beta-hydroxy) amino groups are particularly preferred for use in the coating compositions of this invention.

Polymers tipped with primary amine groups can alternatively be reacted with a lower proportion of an epoxide, for example at an equivalent ratio of 1 to less than 2 epoxide groups per primary amine group, to produce polymers containing some secondary amine groups as well as bis(beta-hydroxy) amino groups. Such polymers are also suitable for use as polymer (B) in the coating composition.

Examples of suitable epoxide compounds for reaction with amine groups in a polymer to introduce beta-hydroxyamino groups are 1,2-epoxyalkanes (where R' is alkyl), styrene oxide (where R' is phenyl), glycidol (where R' is hydroxymethyl) and glycidyl ethers (where R' is —CH$_2$OR", R" being an alkyl, for example butyl, or aryl group). Aryl glycidyl ethers, for example phenyl glycidyl ether, have the advantage of forming beta-hydroxyamino polymers which are compatible on mixing with a wide range of anhydride-functional polymers. At least part of the epoxide used may be a higher molecular weight monoepoxide, for example of molecular weight up to 1000. The use of glycidyl ethers as the epoxide component gives rise to polymers of increased flexibility.

Beta-mercaptoamino functional polymers can be produced by reacting amine-tipped polymers with analogous thiirane compounds.

Hydroxyalkylamine-tipped polymers can also be formed from carboxyl-terminated polymers, for example a carboxyl-terminated linear polyester, by reaction of the carboxyl-terminated polymer with a bis or tris(hydroxyalkyl) tertiary amine. This reaction can be carried out by direct esterification, for example in an organic solvent such as xylene at a temperature in the range of 110° to 180° C. with removal of water. Tris(beta-hydroxyalkyl) amines are preferred since they introduce bis(beta-hydroxy)amine groups; for example triethanolamine reacts to form

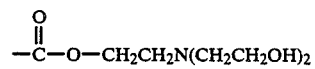

end groups on the polymer. The proportion of tris(hydroxyalkyl) amine used is preferably about 1 mole per equivalent of acid groups in the carboxylic acid terminated polymer or a slight excess of amine, for example 1–1.2 moles amine per equivalent of acid groups. Some chain extension of the polymer may occur through a molecule of triethanolamine reacting with two carboxyl-tipped polymer molecules, but such extended polymers are within the scope of this invention if they are tipped with hydroxyalkylamino groups. Excess amine can be removed by water washing. To achieve tipping with hydroxyalkylamino groups without any chain extension the carboxyl-terminated polymer can be reacted with an excess of a carbodiimide such as dicyclohexyl carbodiimide followed by reaction with a bis or tris(hydroxyalkyl) amine such as triethanolamine. The carbodiimide forms labile anhydride links between the acid-functional polymer chains. The hydroxyalkyl amine reacts with the anhydride links to form an ester bond on one of the hydroxy groups of the amine. Alternatively a carboxyl-tipped polyester can be reacted with thionyl chloride to form acid chloride end groups which can be reacted under mild conditions with triethanolamine in the presence of excess base such as triethylamine.

An alternative process for forming hydroxyethylamino end groups on a carboxyl-tipped polymer, for example a polyester, is to react the polymer with N-(hydroxyethyl) imine to introduce groups of the formula

The secondary amine formed can be reacted with ethylene oxide to introduce further hydroxyl groups if required. Alternatively, the carboxyl-tipped polymer can be reacted with a diepoxide, preferably one having epoxide groups of differing reactivity such as vinyl cyclohexene diepoxide; the epoxy-tipped polymer formed can be reacted with a secondary amine such as diethanolamine to introduce hydroxyalkylamino groups.

A carboxyl-tipped flexible acrylate polymer, for example polybutyl acrylate, can be formed by group transfer polymerisation as described in European Patent 68887.

Hydroxyalkylamino end groups can also be formed by transesterification of a flexible polyester having methoxy end groups with bis or tris(hydroxyalkyl) amine. The polyester can be formed by reaction of a dimethyl ester of a dicarboxylic acid, for example dimethyl adipate, with one or more diols,. It can then be transesterified with a tris(hydroxyalkyl) amine such as triethanolamine in a reaction vessel having provision for distilling off the methanol evolved.

Polyisobutylenes tipped with various reactive end groups are described by B.Ivan et al in J. Polymer Science, Polymer Chemistry Edition, 18, p 3177 (1980).

A flexible polyurethane having isocyanate end groups can be reacted with a bis or tris(hydroxyalkyl) tertiary amine, for example triethanolamine, to introduce hydroxyalkylamino groups.

A polymer (B) tipped with betahydroxyamino groups can be reacted with an aldehyde or ketone to form oxazolidino groups according to the reaction

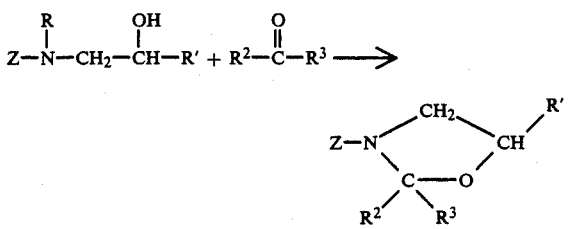

where Z, R and R' are defined as above and $R^2$ and $R^3$ are each hydrogen or an alkyl group. The aldehyde or ketone may for example be formaldehyde, acetaldehyde, acetone or methyl ethyl ketone. The oxazolidino group is readily hydrolysable by moisture to regenerate the beta-hydroxyamino group, so that the combination of an anhydride-functional polymer (A) and a polymer (B) containing oxazolidino groups forms a coating which is moisture-curable at ambient temperature. However, the coating composition is stable in the absence of moisture.

A polymer (B) tipped with bis(beta-hydroxy)amino groups can be reacted with a lactone, for example epsilon-caprolactone, delta-valerolactone or gamma-butyrolactone, to replace some or all of the beta-hydroxy groups by hydroxy-substituted acyloxyalkyl groups in which the hydroxy group is more remote from the amine nitrogen atom. Polymers containing more remotely hydroxy-substituted acyloxyalkylamino groups so formed have a longer pot life on mixing with the anhydride component as compared to the polymers containing beta-hydroxyamino groups. Polymers formed by reacting a polymer tipped with bis(betahydroxy)amino groups with a lactone in molar ratio 1:0.4-4.0 (0.1-1.0 molecules lactone per hydroxy group), particularly about 1:2.0 (for example 0.25 to 0.75 molecules lactone per hydroxy group), may give a particularly good combination of pot life and ambient-temperature-curing properties. The polymer can alternatively be reacted with a stoichiometric excess of lactone, for example up to 2.5 moles lactone per hydroxy group, to form hydroxy-terminated poly(acyloxyalkyl) groups on each amine nitrogen. Such polymers containing poly(acyloxyalkyl) groups have an even longer pot life on mixing with the anhydride component, albeit combined with slower ambient-temperature curing as a coating.

A polymer (B) tipped with hydroxyalkylamino groups can alternatively be reacted with a monoepoxide such as ethylene oxide or propylene oxide, for example 0.1 to 1.0 molecules epoxide per hydroxy group, to form hydroxyalkoxyalkylamino groups which give compositions of longer pot life.

In an alternative method of increasing pot life some of the beta-hydroxy groups can be blocked by a group which will be labile when the composition is applied as a coating. For example, the beta-hydroxy groups may be blocked by trialkylsilyl groups. The Si-O-C bond system is labile to hydrolysis by atmospheric moisture. Trialkylsilyl groups may be introduced by reacting polymer (B) with a trialkylsilyl chloride, for example $(CH_3)_3$ SiCl, in the presence of an organic base, for example a tertiary amine such as triethylamine, or by reacting polymer (B) with a trialkyl alkoxy silane such as $C_2H_5OSi(CH_3)_3$ in the presence of an alkoxide such as $C_2H_5ONa$.

When the polymer (B) comprises a flexible polymer chain, the anhydride polymer (A) preferably has an average of more than two anhydride groups per molecule. Preferred anhydride polymers in this case are polymers derived from an olefinically unsaturated cyclic carboxylic acid anhydride such as disclosed in U.S. Pat. No. 4,452,948. The anhydride polymer is preferably an addition copolymer of an unsaturated anhydride, such as maleic, itaconic, citraconic or vinylsuccinic anhydride or vinyl trimellitate, with at least one ethylenically unsaturated comonomer. Esters of acrylic or methacrylic acid such as butyl acrylate, ethyl acrylate, methyl methacrylate or butyl methacrylate preferably form at least part of the comonomers. Styrene can also be used as a comonomer. Preferred copolymers contain 10-50 per cent by weight maleic or itaconic anhydride groups and have a molecular weight of 4000 to 9000. The anhydride polymer (A) can alternatively be an anhydride adduct of a diene polymer such as maleinised polybutadiene or a maleinised copolymer of butadiene, for example a butadiene/styrene copolymer. An anhydride adduct of an unsaturated fatty acid ester, for example a styrene allyl alcohol copolymer esterified with an unsaturated fatty acid and maleinised, can also be used.

Alternative anhydride-containing polymers can be formed from hydroxyl-containing polymers, for example copolymers of hydroxyethyl acrylate or hydroxyethyl methacrylate or styrene/allyl alcohol copolymers, by reaction with a tricarboxylic compound capable of introducing anhydride groups. Preferred tricarboxylic compounds are those which introduce alicyclic or aliphatic carboxylic acid anhydride groups. Preferred tricarboxylic compounds are those containing a moiety of the formula

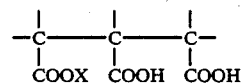

where X is an alkyl group of 1 to 4 carbon atoms or especially a hydrogen atom, or a cyclic anhydride thereof. Anhydrides are generally preferred to the corresponding acids since the reaction may require less heating and produce higher yields. A particularly preferred anhydride is tricarballylic anhydride of the formula

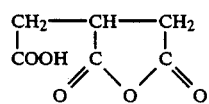

-continued

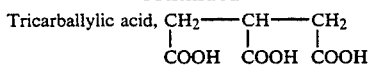

is also effective to introduce anhydride groups on heating, as is citric acid. Hemimellitic anhydride (benzene 1,2,3-tricarboxylic acid anhydride) or acid can also be used, although the aliphatic compounds are preferred. Alicyclic compounds can also be used, for example anhydrides of cyclohexene- or cyclohexane-1,2,3-tricarboxylic acid and derivatives thereof substituted by an alkyl group. An alicyclic tricarboxylic acid anhydride can be formed by Diels-Alder reaction of a 2,4-dienoic acid such as sorbic acid with maleic anhydride according to the formula:

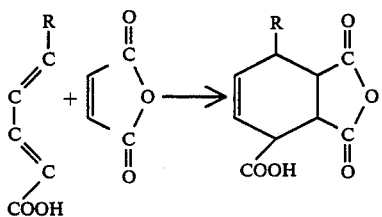

where R is hydrogen or an alkyl group (R is methyl when the dienoic acid is sorbic acid). The cyclohexene tricarboxylic acid anhydride produced can be hydrogenated to form cyclohexane-1,2,3-tricarboxylic acid anhydride before reaction with a hydroxy-functional polymer to produce an anhydride-functional polymer (A) if desired.

Anhydride polymers (A) can also be produced by the reaction of a hydroxy-functional polymer with trimellitic anhydride acid chloride in the presence of a tertiary base; by transacidolysis of the acetate of a hydroxy-functional polymer with trimellitic anhydride; or by thermal esterification of the hydroxy-functional polymer with trimellitic anhydride. These three reactions are described by Puskas and Fields in Ind. Eng. Chem. Prod. Res. Develop., Volume 9, No.3 (1970) at page 403-407. The thermal esterification of hydroxy-functional polymers with trimellitic anhydride is described in European Patent Application 73022. These anhydride-functional polymers can be used as component (A) in the coating compositions of the present invention. The reaction products of hydroxy-functional polymers with aliphatic or alicyclic tricarboxylic compounds are preferred, however, since the reaction with such a compound converts a substantially greater proportion of the hydroxy groups to anhydride groups compared with trimellitic anhydride. Moreover, reaction with an aliphatic or alicyclic tricarboxylic anhydride can be carried out at lower temperatures and can form an anhydride-functional polymer from a hydroxy-functional polymer with a smaller increase in molecular weight and less colour in the product than is the case with reaction with trimellitic anhydride.

Anhydride-tipped polymers (A) which comprise a flexible polymer chain can be prepared from corresponding hydroxyl-tipped polymers by reaction with a tricarboxylic compound as described above, preferably an aliphatic or alicyclic compound having adjacent carboxylic acid groups or an anhydride thereof. Examples of flexible hydroxy-tipped polymers which can be reacted to introduce anhydride groups are polyethers, polyesters, silicones, diene polymers and hydrogenated diene polymers of the types described above in connection with the preparation of polymers (B) containing flexible polymer chains. Alternatively, a flexible amine-tipped polymer can be reacted with an excess of a dianhydride, for example pyromellitic dianhydride, to form a polymer having terminal anhydride groups bound through an imide link An isocyanate-terminated flexible polyurethane can be reacted with the anhydride of a tricarboxylic acid, for example trimellitic anhydride, tricarballylic anhydride or an alicyclic tricarboxylic anhydride, to introduce terminal anhydride groups.

The polymer (B) used with such a flexible anhydride-tipped polymer (A) preferably contains an average of more than two hydroxyalkylamino, hydroxyalkoxyalkylamino, hydroxy-substituted acyloxyalkylamino or poly(acyloxyalkyl)amino, mercaptoalkylamino, or oxazolidino groups per molecule. A preferred polymer containing hydroxyalkylamino groups is a polymer containing beta-hydroxyamino groups produced by the reaction of a polyepoxide with a secondary amine. Examples of polyepoxides are addition polymers of glycidyl acrylate or methacrylate, for example polymers containing 10–30 per cent by weight glycidyl methacrylate, with comonomers such as acrylic esters and styrene, and epoxy novolac resins. Examples of secondary amines are dimethylamine, diethylamine, morpholine, diphenylamine, N-methyl aniline and also N-methyl ethanolamine, N-ethyl ethanolamine and diethanolamine, which introduce further hydroxyl groups in the beta position to the amine nitrogen. The reactivity of the beta-hydroxyamino polymer can be modified by partial reaction with a lactone to introduce hydroxy-substituted acyloxyalkylamino or poly(acyloxyalkyl)amino groups, for example reaction with 0.1 to 1.0 molecules caprolactone per hydroxy group, as described above.

The coating composition of the invention is generally a two-pack coating in which the anhydride polymer (A) and the polymer (B) are stored separately and are mixed shortly before use. The coating can be applied to the substrate by spray, for example conventional airless spray or twin feed spray in which the polymers (A) and (B) are not mixed until the spray head, or by roller or brush. The coating composition generally has a pot life of at least 15 minutes when it is to be applied by airless spray or at least 1 hour after mixing when applied by other techniques. The coating is generally capable of curing on the substrate to a tough tack-free film within 24 hours at ambient temperature, for example 10°–40° C. Maximum impact-resistance generally develops over a number of days at ambient temperature, for example 5–20 days. Many of the preferred coating compositions according to the invention, particularly those in which the polymer (B) is tipped with bis(beta-hydroxy)amino groups, will cure at least to tack-free condition at ambient temperatures as low as 0° C. The low glass-transition temperatures of the flexible polymers used in the invention allow reaction between polymers (A) and (B) to continue to a high state of cure even at low temperatures. Curing may be carried out at temperatures above ambient, for example in the range of 40° to 100° C. or even 15° C., for shorter times if this is more convenient, for example when coating under factory conditions.

The proportion of anhydride groups in the polymer (A) to anhydride-reactive groups in the polymer (B) is preferably 0.5:1 to 2:1.

The anhydride polymer (A) and the polymer (B) containing anhydride-reactive groups are each preferably dissolved in a solvent, such as a hydrocarbon and/or a polar organic solvent, for example xylene or toluene or mixtures thereof with an ester such as butyl acetate or ethoxyethyl acetate or methoxypropyl acetate or with a ketone such as methyl isobutyl ketone or methyl isoamyl ketone. For most uses the polymers (A) and (B) are preferably compatible both in solution and in the absence of solvent so that a clear coating is obtained. For some uses in which toughness of the coating is more important than appearance the polymers may be less compatible so that there is some phase separation as the coating dries, leading to domains of one polymer in a matrix of the other polymer. This can give increased impact-resistance. The coating composition usually contains additives such as pigments or fillers which can be included in either or both of the components of the paint.

The invention is illustrated by the following Examples in which percentages are by weight.

EXAMPLE 1

Preparation of Anhydride-Functional Resin

Itaconic anhydride (390.2 g) methyl methacrylate (292.7 g), styrene (1268.3 g) and 2,2'-azobis-(2-methylbutyronitrile) (97.6 g) were dissolved in methyl isobutyl ketone (1048 g). Methyl isobutyl ketone (1000 g) was heated to reflux in a 5 liter flask fitted with stirrer, temperature probe, condenser and nitrogen blanket, and the above mixture added steadily over two hours. After completion of monomer addition, the mixture was held at reflux for a further hour. The resulting clear polymer had a molecular weight of 4,0005,000 and a solids content of 50% in methyl isobutyl ketone.

Preparation of Hydroxyalkylamine-Functional Resin

Bis(3-aminopropyl)poly(tetramethylene oxide) (M.W. 2100, 300 g) was dissolved in methyl isobutyl ketone (342 g), and heated to reflux in a 1 liter reaction flask fitted with stirrer, temperature probe, nitrogen blanket and condenser. 42.3 g (0.57 moles) glycidol was added dropwise over 30 minutes. The mixture was further maintained at reflux for 1 hour. The resulting adduct was a clear lightly-coloured resin having 2,3-dihydroxypropylamino and/or bis(2,3-dihydroxypropyl)amino groups at the propyl ends of a bis(propyl)poly(tetramethylene oxide) flexible chain, the resin being present at 50% solids in methyl isobutyl ketone.

Coating Composition 119.8 g of the hydroxyalkylamine-functional resin solution was mixed with 112.0 g of the anhydride copolymer solution so that the ratio of hydroxyl groups to anhydride groups was 2:1. The resulting cloudy mixture had a pot life of 30 minutes. Casting onto steel plates followed by ambient (about 20° C.) cure gave a hard, colourless, tack-free film within 16 hours.

EXAMPLE 2

Preparation of Hydroxyalkylamine-Functional Resin

Bis(3-aminopropyl)poly(tetramethylene oxide) (M.W. 2100, 100 g) was dissolved in toluene (128.6 g) and heated to reflux in a 500 ml reaction flask fitted with stirrer, temperature probe, nitrogen blanket and condenser. 28.6 g (0.19 moles) phenyl glycidyl ether was added dropwise over 30 minutes. The mixture was further maintained at reflux for 1 hour. The resulting adduct was a clear, lightly-coloured resin at 50% solids in toluene.

Coating Composition 135.0 g of the hydroxyalkylamine-functional resin solution was mixed with 112.0 g of the anhydride copolymer solution of Example 1 so that the ratio of hydroxyl groups to anhydride groups was 1:1. The resulting clear mixture had a pot life of 15 minutes. Casting onto steel plates followed by ambient (about 20° C.) cure gave a flexible, colourless, clear, tack-free film within 24 hours.

EXAMPLE 3

Preparation of Hydroxy-Functional Resin

Bis-(3-aminopropyl)poly(tetramethylene oxide) (M.W. 750, 113 g) was dissolved in toluene (220 g) and heated to reflux in a 500 ml reaction flask fitted with stirrer, temperature probe, nitrogen blanket and condenser. 90.4 g (0.60 moles) phenyl glycidyl ether was added dropwise over 30 minutes. The mixture was further maintained at reflux for 1 hour. Dibutyl tin dilaurate (0.22 g) was added to the mixture as catalyst. Epsilon-Caprolactone (17.2 g , 0.15 moles) was added dropwise over 30 minutes. The mixture was further maintained at reflux for 1 hour. The adduct was a clear resin at 50% solids in toluene. The resin contained hydroxyalkylamine and hydroxyacyloxyalkylamine groups as terminal groups on a flexible polymer chain.

Coating Composition 73.2 g of the hydroxy-functional resin solution was mixed with 112.0 g of the anhydride copolymer solution of Example 1 so that the ratio of hydroxyl groups to anhydride groups was 1:1. The resulting clear mixture had a pot life of 2 hours. Casting onto steel plates followed by ambient cure gave a tough lightly-coloured, clear, tack-free film within 24 hours.

EXAMPLE 4

The procedure of Example 3 was repeated except that the amount of epsilon-caprolactone was increased to 34.3 g (0.30 moles). The coating composition had similar properties to that of Example 3 with a longer pot life and slightly longer curing time, but still cured to a tough, clear, tack-free film within 24 hours.

EXAMPLE 5

Preparation of Anhydride-Functional Copolymer

Maleic anhydrid-e (200 g, 2.04 moles), methyl methacrylate (150 g, 1.50 moles), styrene (650 g, 6.25 moles) and 2,2'-azobis-(2-methylbutyronitrile) (50.0 g) were dissolved in toluene (700 g). Toluene (1000 g) was heated to reflux in a 5000 ml reaction flask fitted with stirrer, temperature probe, condenser and nitrogen blanket, and the above mixture added steadily over two hours. On completion of monomer addition, the mixture was held at reflux for a further hour (until the refractive index remained constant). The resulting clear polymer had a molecular weight of 6000–8000 and a solids content adjusted to 50% (w/w) in toluene.

Coating Composition 76.4 g of the hydroxyamine-functional resin solution of Example 1 was mixed with 62.5 g of the anhydride copolymer solution, so that the ratio of hydroxyl groups to anhydride groups was 2:1. The resulting clear mixture had a pot-life of 5 minutes. Casting onto steel plates followed by ambient (about 20° C.) cure gave a hard, tough, tack-free film within 8 hours. The resistance to toluene solvent was fairly good.

Casting onto steel plates followed by curing at 120° C. for 20 minutes gave a film with excellent resistance to toluene.

EXAMPLE 6

73.2 g of the hydroxy-functional resin solution of Example 3 was mixed with 93.9 g of the anhydride-funcional copolymer solution of Example 5 so that the ratio of hydroxyl groups to anhydride groups was 1:1. The resulting clear mixture had a pot-life of 15 minutes. Casting onto steel plates followed by ambient (about 20° C.) cure gave a lightly-coloured, clear, tack-free film within 24 hours. The resistance to toluene solvent was good.

EXAMPLE 7

Preparation of Mercaptoalkylamine-Functional Resin

Bis-(3-aminopropyl)poly(tetramethylene oxide) (M.W. 2100, 105.0 g) was dissolved in toluene (120 g) and heated in a 500 ml reaction flask fitted with condenser, temperature probe, nitrogen blanket and stirrer to 80° C. for 1 hour. Propylene sulphide (14.8 g, 0.2 moles) was added over 30 minutes. The adduct was further maintained at 80° C. for 1 hour. The adduct was a clear, pale orange, mobile resin at 50% solids (w/w) in toluene. The resin contained mercaptoalkylamine groups.

Coating Composition 80.0 g of the mercaptoalkylamine-functional resin solution was mixed with 74.8 g of the anhydride copolymer solution of Example 1, so that the ratio of mercapto groups to anhydride groups was 1:1. The resulting mixture gave a two-phase film which cured slowly at ambient temperature and more rapidly at elevated temperature.

EXAMPLE 8

Preparation of Hydroxy-Functional Resin

Adipic acid (707.6 g, 4.64 moles), ethylene glycol (62.1 g, 1.2 moles) and butane-1,4-diol (173.1 g, 1.92 moles) were mixed in a 2000 ml reaction flask fitted with temperature probe, Dean and Stark apparatus and a nitrogen blanket. The materials were refluxed, distilling off water, from 120°-190° C. At 190° C., xylene (65 ml) was added to assist the removal of water by azeotrope and an adjustment made for glycol loss in the distllate. The temperature rose to 220° C. at which point 99% of the theoretical yield of water was reached. The polymer was stripped under vacuum to constant weight. The polymer was a viscous, clear, colourless liquid (crystallizing slowly on standing). End-group analysis gave an acid value corresponding to a molecular weight of 900. 109.1 g of the polymer was dissolved in dioxan (200 g) and cooled to 0° C. Dicyclohexylcarbodiimide (50.0 g, 0.24 moles) was added as a melt at 40° C. to the ice-cooled solution above, the temperature remaining below 10° C. Copious quantities of white precipitate were produced. The mixture was allowed to stir for 1 hour after addition. Triethanolamine (36.2 g, 0.24 moles) was added to the above mixture, again keeping the temperature below 10° C. The resulting mixture was stirred at 10° C. for 1 hour, then filtered and washed with dioxan. The resulting extremely pale yellow mobile liquid was vacuum-stripped to constant weight yielding a clear, very pale yellow viscous liquid resin containing bis(2-hydroxyethyl)amino ethyl terminal groups on a flexible polymer chain.

Preparation of Anhydride Copolymer

An anhydride copolymer was prepared using the reagents and conditions described in Example 1 but using methoxypropyl acetate as solvent in place of methyl isobutylketone. The copolymer had a molecular weight of 4000–6000 and was prepared as a 50% solution in methoxypropyl acetate.

Coating Composition 56 0 g of the anhydride copolymer solution was mixed with 14.5 g of methoxypropyl acetate and 14.5 g of the hydroxy-functional resin, so that the ratio of anhydride groups to hydroxyl groups was 1:1. The resulting clear mixture had a pot life of 4 hours. Casting onto steel plates followed by ambient cure gave a tough, clear, almost colourless, tack-free film within 24 hours.

EXAMPLE 9

Preparation of Hydroxy-Functional Resin

In a reaction vessel equipped with a stirrer, Dean and Stark trap, nitrogen bleed and temperature probe was mixed adipic acid (4600 g), ethylene glycol (775 g) and butane-1,4-diol (1126 g). The mixture was heated over 4 hours to 220° C. producing 850 g water of reaction. Xylene (500 g) was added and heating maintained for a further 3 hours giving a total of 902 g of water. The resultant polyester was dissolved in xylene (2000 g) and triethanolamine (2089 g) and the solution heated at reflux until 255.0 g water of reaction had been collected. The solvent was removed in vacuo and the polyester product washed five times with its own volume of water and dried by azeotropic distillation with xylene.

Coating Composition

The hydroxyl-functional polyester described above (6.50 parts weight) was mixed with 22.4 parts of a 50% by weight solution in butyl acetate of the anhydride-functional copolymer described in Example 1 and applied to a steel plate at a wet film thickness of 150 micron.

The mixture showed a usable pot-life of 50 minutes at 25° C. and a gel-time of 2 hours. The film was cured at 25° C and was handleable after 1 hour, and showed good solvent resistance (50 acetone rubs) after 24 hours. When the composition was similarly applied but cured at 5° C. the film was handleable after 24 hours.

EXAMPLE 10

Preparation of Hydroxy-Functional Resin

To a solution of the hydroxy-functional polyester of Example 9 (735.0 g) in xylene (875.0 g) containing dibutyltindilaurate (0.921 g) at reflux in a reaction vessel equipped with a stirrer, temperature probe, nitrogen bleed and reflux condenser was added drop-wise over 1.5 hours epsilon-caprolactone (140.0 g). Reflux was maintained for a further 2 hours and then the solvents removed in vacuo.

Coating Composition

A mixture of the above caprolactone-modified polyester (7.50 parts weight) and the anhydride-functional polymer solution used in Example 9 (22.4 parts weight of a 50% by weight solution) was applied to a steel plate at a wet film thickness of 150 micron. The mixture showed a usable pot-life of 4 hours and a gel time of 12 hours. The film was cured at 25° C. and was handleable after 2 hours and showed good solvent-resistance to acetone after 24 hours.

EXAMPLE 11

Preparation of Anhydride-Functional Resin 100.8 g bis(3-amino-propyl)-poly(tetramethylene oxide) of M.W.2100 was added over 1 hour to a refluxing suspension of 23.0 g pyromellitic dianhydride in 200 g methyl isobutyl ketone. The brown solution formed was heated with azeotropic distillation for 3.5 hours to remove 2.3 ml water. The solution was concentrated to 80% solids. A sample of it was dried on a rotary evaporator and the liquid resin obtained had a infra-red spectrum showing the presence of anhydride and imide groups. The equivalent weight of the resin was 1270 per anhydride group.

Preparation of Hydroxy-Functional Resin 742 g methyl methacrylate, 116 g hydroxyethyl acrylate, 62 g diethylaminoethyl methacrylate, 5 g azobisisobutyronitrile and 40 g dodecyl mercaptan were mixed and added over 4 hours to 1000 g refluxing methyl isobutyl ketone. Heating at reflux was continued for a further 1.5 hours with addition of two 0.1 g portions of azobisisobutyronitrile at half-hourly intervals. The product was a pale yellow solution of an acrylic copolymer of MW 10,000 and hydroxyl equivalent weight 1,000.

Coating Composition 79.2 g of the 80% anhydride-functional resin solution was mixed with 100 g of the hydroxy-functional resin solution. When the mixture was cast on aluminium sheet a clear hard film was formed within 16 hours at ambient temperature.

What is claimed is:

1. A coating composition comprising
   (A) an anhydride polymer containing at least two cyclic carboxylic acid anhydride functional groups and
   (B) a polymer containing at least two functional groups reactive with anhydride groups and selected from the group consisting of hydroxyalkylamino, hydroxyalkoxy-alkylamino, hydroxy-substituted acyloxyalkylamino, hydroxy-substituted polyacyloxyalkylamino, mercaptoalkylamino and oxazolidino groups,
   one of the polymers (A) and (B) comprising at least one flexible polymer chain selected from the group consisting of polyether, polyester, silicone, diene polymer, hydrogenated diene polymer, polyurethane, polyisobutylene and polyacrylate chains and having at least two functional groups present in the polymer as terminal groups separated by the flexible polymer chain.

2. A coating composition according to claim 1 in which the flexible polymer chain is an aliphatic polyether chain having a molecular weight 200 to 3500.

3. A coating composition according to claim 1 in which the flexible polymer chain is aliphatic polester chain having a molecular weight of 500 to 4000.

4. A coating composition according to claim 1 in which the flexible polymer chain is a diene polymer or hyrogenate diene polymer chain having a molecular weight of 500 to 7000.

5. A coating composition according to claim 1 in which the polymer (D) comprises a flexible polymer chain and its functional groups present as terminal groups at the ends of the flexible polymer chain are beta-hydroxyamino groups.

6. A coating composition according to claim 1 in which the polymer (B) comprises a flexible polymer chain and its functional groups present as terminal groups at the ends of the flexible polymer chain comprise acyloxyalkyl groups formed by reacting bis(beta-hydroxy) amino groups with a lactone.

7. A coating composition according to claim 6 in which the polymer (B) contains bis(beta-hydroxy) amino terminal groups and acyloxyalkyl terminal groups and is formed by reacting a polymer having bis(beta-hydroxy) amino terminal groups with 0.1 to 11.0 molecules of a lactone per hydroxy group in the bis(beta-hydroxy) amino terminated polymer.

8. A coating composition according to claim 1 in which the polymer (B) comprises a flexible polymer chain and the anhydride polymer (A) has an average of more than 2 anhydride groups per molecule.

9. A coating composition according to claim 1 in which the polymer (A) comprises a flexible polymer chain and the polymer (B) is a polymer containing an average of more than 2 functional groups reactive with anhydride groups per molecule.

10. A coating composition comprising:
    (A) an anhydride polymer containing more than two cyclic carboxylic acid anhydride functional groups and
    (B) a polymer comprising at least one flexible aliphatic polyester chain having at least two beta-hydroxy amino groups which are reactive with anhydride groups and which are present in the polymer as terminal groups separated by the flexible aliphatic polyester chain.

11. The composition of claim 10 wherein said aliphatic polyester chain has a molecular weight of 500 to 4000.

12. A coating composition according to claim 10 in which the said terminal groups are bis(beta-hydroxy) amino groups of the formula

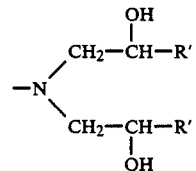

where R' represents hydrogen or an organic group attached through a carbon atom and optionally substituted by a group not reactive with amine groups.

13. A coating composition according to claim 12 in which the bis(beta-hydroxy) amino groups are present as groups of the formula

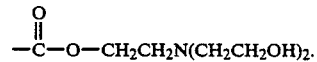

* * * * *

UNITED STATES PATENT AND TRADEMARK OFFICE
CERTIFICATE OF CORRECTION

PATENT NO. : 4,826,921

DATED : May 2, 1989

INVENTOR(S) : ANDREWS ET AL.

It is certified that error appears in the above-identified patent and that said Letters Patent is hereby corrected as shown below:

Column 8, line 64, "15°C" should be --150°C--.
Column 9, line 34, "4,0005,000" should be --4,000 - 5,000--.
Column 12, line 17, "56 0" should be --56.0--.
In the Claims
Column 14, line 9, "(D)" should be --(B)--.
Column 14, line 23, "11.0" should be --1.0--.

Signed and Sealed this

Twenty-seventh Day of March, 1990

Attest:

JEFFREY M. SAMUELS

*Attesting Officer*     *Acting Commissioner of Patents and Trademarks*